(12) United States Patent
Kulkarni et al.

(10) Patent No.: US 8,285,659 B1
(45) Date of Patent: Oct. 9, 2012

(54) AIRCRAFT SYSTEM MODELING ERROR AND CONTROL ERROR

(75) Inventors: Nilesh V. Kulkarni, Saratoga, CA (US); John T. Kaneshige, Fremont, CA (US); Kalmanje S. Krishnakumar, Cupertino, CA (US); John J. Burken, Tehachapi, CA (US)

(73) Assignee: The United States of America as Represented by the Administrator of the National Aeronautics & Space Administration (NASA), Washington, DC (US)

( * ) Notice: Subject to any disclaimer, the term of this patent is extended or adjusted under 35 U.S.C. 154(b) by 457 days.

(21) Appl. No.: 12/543,411

(22) Filed: Aug. 18, 2009

(51) Int. Cl.
*G05B 13/02* (2006.01)
(52) U.S. Cl. ............ 706/23; 244/76 R; 244/99.9; 701/3; 703/8
(58) Field of Classification Search .................. 706/23
See application file for complete search history.

(56) References Cited

U.S. PATENT DOCUMENTS

| | | | | |
|---|---|---|---|---|
| 6,041,273 A * | 3/2000 | Burken et al. | ..................... | 701/3 |
| 6,102,330 A * | 8/2000 | Burken et al. | ..................... | 244/76 R |
| 6,126,111 A * | 10/2000 | Burcham et al. | ........... | 244/76 R |
| 6,185,470 B1 * | 2/2001 | Pado et al. | ..................... | 700/104 |
| 6,332,105 B1 * | 12/2001 | Calise et al. | ..................... | 701/3 |
| 6,735,500 B2 * | 5/2004 | Nicholas et al. | ................. | 701/3 |
| 6,751,529 B1 * | 6/2004 | Fouche | ............................. | 701/3 |
| 6,873,887 B2 * | 3/2005 | Zagranski et al. | ................ | 701/3 |
| 6,879,885 B2 * | 4/2005 | Driscoll et al. | ................ | 701/3 |
| 7,177,710 B2 * | 2/2007 | Calise et al. | .................... | 700/28 |
| 2004/0162647 A1 * | 8/2004 | Koshizen et al. | ................ | 701/2 |
| 2004/0181499 A1 * | 9/2004 | Corban | ........................... | 706/48 |

OTHER PUBLICATIONS

Rysdyk, et al., Fault Tolerant Flight Control via Adaptive Neural Network Augmentation, AIAA Guidance, Navigation, and Control Conference and Exhibit, Aug. 10-12, 1998, Boston, MA.
Narendra, et al., Stable Adaptive Controller Design, Part II: Proof of Stability, IEEE Transactions on Automatic Control, Jun. 1980, 440-448, AC-25, No. 3.
Narendra, et al., "Stable Discrete Adaptive Control," IEEE Transactions on Automatic Control, Jun. 1980, 456-461, AC-25, No. 3.
Lin, et al., A New Error Model for Adaptive Systems, IEEE Transactions on Automatic Control, Jun. 1980, 585-587, AC-25, No. 3.
Kaneshige, et al., Generic Neural Flight Control and Autopilot System, AIAA Guidance, Navigation, and Control Conference, Aug. 2000. AIAA-2000-4281.

(Continued)

*Primary Examiner* — Jeffrey A Gaffin
*Assistant Examiner* — David H Kim
(74) *Attorney, Agent, or Firm* — John F. Schipper; Robert M. Padilla

(57) ABSTRACT

A method for modeling error-driven adaptive control of an aircraft. Normal aircraft plant dynamics is modeled, using an original plant description in which a controller responds to a tracking error $e(k)$ to drive the component to a normal reference value according to an asymptote curve. Where the system senses that (1) at least one aircraft plant component is experiencing an excursion and (2) the return of this component value toward its reference value is not proceeding according to the expected controller characteristics, neural network (NN) modeling of aircraft plant operation may be changed. However, if (1) is satisfied but the error component is returning toward its reference value according to expected controller characteristics, the NN will continue to model operation of the aircraft plant according to an original description.

3 Claims, 11 Drawing Sheets

Adaptive Control Architecture

OTHER PUBLICATIONS

Kaneshige, et al., Integrated neural flight and propulsion control system, AIAA Guidance, Navigation, and Control Conference, Aug. 2001, AIAA-2001-4386.

Nguyen, et al., Dynamics and Adaptive Control for Stability Recovery of Damaged Asymmetric Aircraft, AIAA Guidance, Navigation, and Control Conference, Aug. 2006, AIAA-2006-6049.

Krishnakumar, et al., An Adaptive Critic Approach to Reference Model Adaptation, AIAA Guidance, Navigation, and Control Conference, Aug. 2003, AIAA-2003-5790.

Kulkarni, Adaptive Disturbance Rejection Control Using System Input-Output Data, AIAA Guidance, Navigation, and Control Conference, Aug. 21-24, 2006, AIAA-2006-6414, Keystone, Colorado.

Goodwin, et al., Discrete-time Multivariable Adaptive Control, IEEE Transactions on Automatic Control, Jun. 1980, 449-456, vol. 25, No. 3.

Kaneshige, et al., Enhancements to a Neural Adaptive Flight Control System for a Modified F-15 Aircraft, AIAA Guidance, Navigation, and Control Conference and Exhibit, Honolulu, HI, Aug. 2008, AIAA-2008-6986.

* cited by examiner

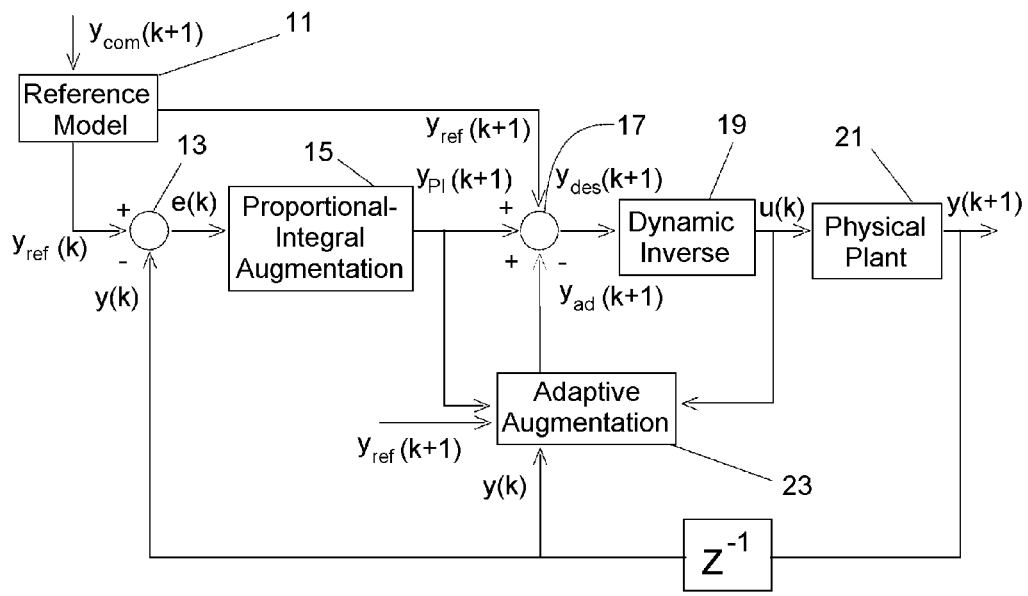
FIG. 1    Adaptive Control Architecture
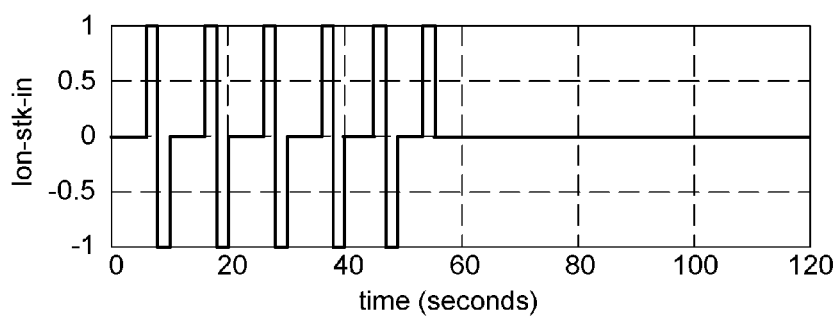
FIG. 2A
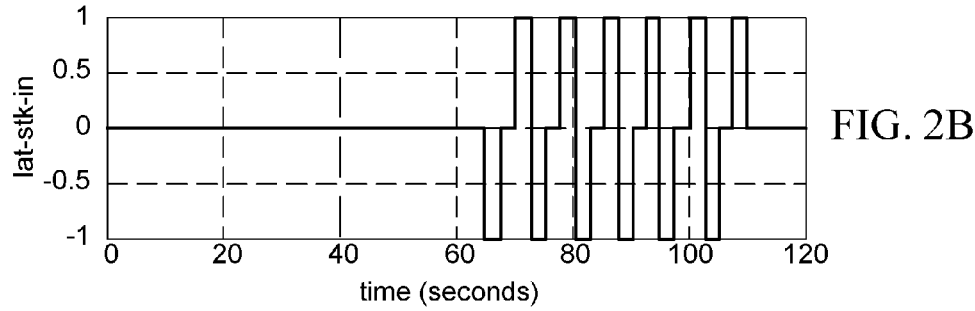
FIG. 2B Mach 0.75, Alt 20K - Right Stab Lock at 4 deg - Failure Inserted at t = 10 sec Mach 0.75, Alt 20K - Right Stab Lock at 4 deg - Failure Inserted at t = 10 sec Mach 0.75, Alt 20K - Right Stab Lock at 4 deg - Failure Inserted at t = 10 sec Mach 0.75, Alt 20K - Right Stab Lock at 4 deg - Failure Inserted at t = 10 sec Mach 0.75, Alt 20K - Right Stab Lock at 4 deg - Failure Inserted at t = 10 sec Mach 0.75, Alt 20K - Canard Multiplier at -1 - Failure Inserted at t = 10 sec Mach 0.75, Alt 20K - Canard Multiplier at -1 - Failure Inserted at t = 10 sec Mach 0.75, Alt 20K - Canard Multiplier at -1 - Failure Inserted at t = 10 sec Mach 0.75, Alt 20K - Canard Multiplier at -1 - Failure Inserted at t = 10 sec Mach 0.75, Alt 20K - Canard Multiplier at -1 - Failure Inserted at t = 10 sec

AIRCRAFT SYSTEM MODELING ERROR AND CONTROL ERROR

ORIGIN OF THE INVENTION

This invention was made, in part, by one or more employees of the U.S. government. The U.S. government has the right to make, use and/or sell the invention described herein without payment of compensation, including but not limited to payment of royalties.

FIELD OF THE INVENTION

This invention relates to minimization of modeling error and control error for an aircraft system.

BACKGROUND OF THE INVENTION

If an aircraft/spacecraft vehicle encounters a failure (such as a jammed control surface or loss of a surface), most controllers cannot adapt to the failure and a crash may occur. In most cases, the vehicle has enough redundant actuation mechanisms to salvage the vehicle. Several airplane crashes have occurred in the past where the pilot is unable to control the damaged airplane due to the pilot's inability to learn to fly this altered aircraft configuration in the very short time available. The flight computer, however, may have the necessary information as well as bandwidth available to learn the new dynamics, and control the vehicle within a reasonable time interval.

The flight computer needs an intelligent controller that flies the vehicle with the baseline controller during nominal conditions, and adapts the design, when the vehicle suffers damage. Thus, given the information about the vehicle from all the available sensors, the control system needs to determine whether the vehicle is in its nominal state or is damaged. One approach to deal with this is to utilize smart algorithms that attempt to identify the vehicle characteristics and to change the control system, if necessary. This approach is known as Indirect Adaptive Control. For systems such as airplanes, there is usually very little time available to make changes to the control system, and this indirect approach is often insufficient to achieve the desired safety metrics. Another approach, known as the direct adaptive control ("DAC"), looks directly at the errors, and updates the control law accordingly. This is typically much faster and meets the timing considerations for airplane system implementations.

The current state of the art implementation consists of the Intelligent Flight Control Architecture that uses a DAC approach. This has been implemented by us at the NASA Ames Research Center, and has been test flown on the F-15 research aircraft at the Dryden Flight Research Center. The update law uses tracking error to change the control law. This approach is based on the work at the Georgia Tech Aerospace Engineering Department, under R. T. Rysdyk and A. J. Calise, "Fault Tolerant Flight Control Via Adaptive . . . Augmentation" AIAA 98-4483.

When operating in the real world, an airplane will always have tracking errors associated with its states. For example, when an pilot provides an aggressive stick command, there is always a large transient tracking error that eventually disappears as the controller continues to perform. Adaptation should typically occur only when the aircraft experiences damage or change in its flight configuration, which the original control design cannot deal with. Usually much effort goes into the design of the nominal baseline control design, which should be changed only if necessary.

What is needed is an approach that implements DAC that looks not just at the tracking error, but rather its characteristics or evolution over time to determine whether the controller needs to be adapted or left alone. The time evolution of the tracking error provides clues for investigating whether the system is in good health or has undergone damage/faults. This crucial piece of available information remains un-utilized in all the existing DAC approaches.

SUMMARY OF THE INVENTION

This invention presents a novel stable discrete-time adaptive law that is designed and implemented for flight control to targets damages/modeling errors in a direct adaptive control (DAC) framework. The approach is based on the observation that, where modeling errors are not present, the original control design has been tuned to achieve the desired performance. The adaptive control should, therefore, work towards achieving back this performance only when the design has modeling uncertainties/errors or when the vehicle suffers damage or substantial flight configuration change. In this work, the baseline controller uses dynamic inversion with proportional-integral augmentation. Dynamic inversion is carried out using the assumed system model. On-line adaptation of this control law is achieved by providing a parameterized augmentation signal to a dynamic inversion block. The parameters of this augmentation signal are updated to achieve the nominal desired error dynamics. Contrary to the typical Lyapunov-based adaptive approaches that guarantee only stability, the current approach investigates conditions for stability and for performance. A high-fidelity F-15 aircraft model is used to illustrate the overall approach.

Operationally, the aircraft plant dynamics is modeled, using the original plant description without changes, and the parameters representing the plant components are monitored. Under normal conditions, the controller responds to an excursion in the tracking error $e(k)$, which is the difference between the desired and the actual aircraft behavior, and drives this tracking error toward a zero value according to n asymptote curve that is characteristic of the controller. If the tracking error does not conform to, or lie close to, this asymptotic curve, a resulting error (difference between desired error behavior and actual error behavior) is observed. This difference, called the performance error $E(k)$, represents a difference between normal aircraft parameters and damaged aircraft parameters, and its components are monitored.

Assume that the system senses that (1) at least one component of aircraft tracking error $e(k)$ is experiencing an excursion and (2) the return of this component value toward a reference value (e.g., a constant, such as 0) is not proceeding according to the expected controller characteristics (which gives rise to a non-zero magnitude $|E(k)|$ above an expected threshold magnitude). Only when both conditions (1) and (2) are satisfied will the system reactivate the neural network (NN), change the plant dynamics according to the NN, and change the modeling of aircraft plant operation. Where condition (1) is satisfied but the return of the vector component $e(k)$ toward the reference value proceeds according to the controller characteristics ($E(k)=0$), or within a selected neighborhood of this asymptote, so that condition (2) is unsatisfied, the system will not change modeling of the plant operation. In this latter instance, the NN will continue to model operation of the aircraft plant according to the original model. In a prior art approach, as long as condition (1) is satisfied, modeling of the aircraft plant dynamics is changed, irrespective of whether the components of the vector E(k) are following the controller characteristics.

BRIEF DESCRIPTION OF THE DRAWINGS

FIG. 1 illustrates the overall adaptive control architecture.

FIGS. 2A and 2B graphically illustrate pilot longitudinal and lateral stick input signals.

DESCRIPTION OF THE INVENTION

Figure 3A:
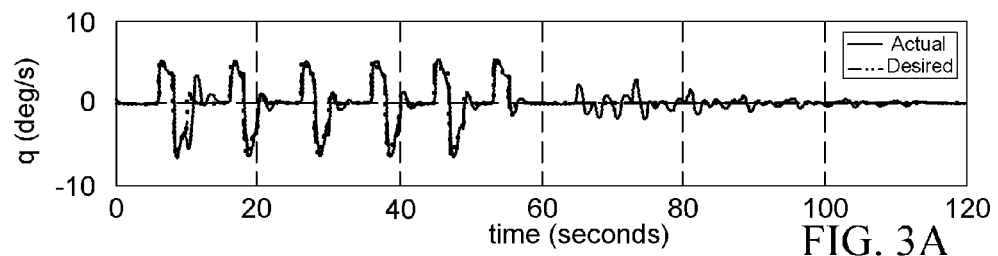
FIGS. 3A-3C through 5A-5C graphically illustrate aircraft pitch, roll and yaw behavior for a selected test.

An adaptive controller, according to the invention, updates the nominal baseline control approach only if there is a modeling error or damage occurs or a substantial change in flight configuration occurs that cannot be corrected in a conventional manner by the controller.

Control Architecture.

FIG. 1 presents the overall adaptive control architecture and schematically illustrates an embodiment of adaptive control architecture for practicing the invention. A reference module 11 provides a vector $y_{ref}(k+1)$ of one or more aircraft system variables that are to be monitored and controlled, where k is a monotonically increasing time index. The reference vector $y_{ref}(k)$ is received at a first difference module 13 that forms a difference vector, $y_{ref}(k)-y(k)=e(k)$ that represents an error vector between a presently sensed aircraft system vector y(k) and the reference vector $y_{ref}(k)$, which becomes an input signal for a proportional integral augmentation (PIA) module 15. An output signal $y_{Pe}(k+1)$ the PIA module 15 is received at a first positive terminal of a second difference module 17, which receives the reference vector $y_{ref}(k)$ at a second positive input terminal and receives an adaptive augmentation signal $y_{ad}(k+1)$ at a negative input terminal. The output (difference) signal $y_{des}(k+1)$ of the second difference module 17 is received as an input signal at a dynamic inverse module 19, which generates an output control signal vector u(k). The control signal vector u(k) is received by an aircraft physical plant module 21 that generates an aircraft system output vector y(k+1), which is received by the first difference module 13 and as a first input signal y(k) at an adaptive augmentation (AA) module 23. The AA module 23 also receives a second input signal $y_{Pe}(k+1)$ and a third input signal $y_{ref}(k+1)$ and generates an output adaptive augmentation signal $y_{ad}(k+1)$.

The control system is given a command, $y_{com}(k+1)$ (e.g., pitch rate command from the pilot's stick). The time index (k+1) refers to the desired value at the next time index (k+1). Given the knowledge of how fast or slow the aircraft plant can handle such a command, it is typically taken through a second order reference model, with appropriate damping and natural frequency to obtain the corresponding achievable reference command $y_{ref}(k+1)$. It is important to note that the value for the time index (k+1) for this reference signal is not necessarily computed at time index (k+1), but is the desired reference value of the output the time index (k+1) that is computed at time index (k). The controller is designed to achieve a prescribed second order error dynamics with respect to this reference command. Let this error dynamics, in a discrete form, be given in scalar form as:

$$e(k+1)+K_{Pe}e(k)+K_{1e}e_1(k)=0, \quad (1A)$$

$$e(k)=y(k)-y_{ref}(k) \quad (1B)$$

where $e_{1k}$ represents the integrated error until time index k. $K_{Pe}$ and $K_{1e}$ are gains, chosen appropriately to have the desired transient response characteristics. Equation (1), with the definition of the error e(k), is used to compute the control input to achieve the desired error dynamics as follows. Equation (1) can be re-expressed as $$y(k+1)=y_{ref}(k+1)+K_{Pe}\{y_{ref}(k)-y(k)\}-K_{1e}e_1(k) \quad (2)$$

The plant output y(k+1) must satisfy Eq. (2) to achieve the prescribed second order error dynamics. The right hand side of Eq. (2) can thus be labeled as $y_{des}(k+1)$, the desired plant output. Thus, $$y_{des}(k+1)=y_{ref}(k+1)+K_{Pe}\{y_{ref}(k)-y(k)\}-K_{1e}e_1(k) \quad (3)$$

Again, note that this value of the desired output at time index (k+1) is computed at time index (k). Let the plant dynamics be given as:

$$y(k+1) = f\{y(k), y(k-1), \ldots, y(k-p_y); u(k-1), \ldots, u(k-p_u)\} + \quad (4)$$
$$g\{y(k), y(k-1), \ldots, y(k-p_y); u(k-1), \ldots, u(k-p_u)\}\, u(k)$$

We can thus invert the dynamics represented by Eq. (4) to compute the control function u(k) to achieve the desired error dynamics, Eq. (1), as:

$$u(k) = \{y_{ref}(k+1) + K_{Pe}\{y_{ref}(k)-y(k)\} - K_{1e}e_1(k) - \quad (5)$$
$$f\{y(k), y(k-1), \ldots, y(k-p_y); u(k-1), \ldots, u(k-p_u)\}\}/$$
$$g\{y(k), y(k-1), \ldots, y(k-p_y); u(k-1), \ldots, u(k-p_u)\},$$

where f and g are functions characterizing the plant.

This control input, with exact knowledge of the plant (f and g), will help achieve the desired second order error dynamics. With modeling uncertainties and other errors, we will not know f and g exactly, but only their estimates given by the model, $\hat{f}$ and $\hat{g}$. The adaptive augmentation is now designed to offset these modeling errors, so that we can get the same error dynamics or the desired performance. With the adaptive augmentation, as shown in FIG. 1, the desired output $y_{des}(k+1)$ is given as:

$$y(des)(k+1)=y_{ref}(k+1)+K_{Pe}\{y_{ref}(k)-y(k)\}-K_{1e}e_1(k)-y_{ad}(k) \quad (6)$$

The control input is given as:

$$u(k) = \{y_{ref}(k+1) + K_{Pe}\{y_{ref}(k)-y(k)\} - K_{1e}e_1(k) - y_{ad}(k) - \quad (7)$$
$$\hat{f}\{y(k), y(k-1), \ldots, y(k-p_y); u(k-1), \ldots, u(k-p_u)\}\}/$$
$$\hat{g}\{y(k), y(k-1), \ldots, y(k-p_y); u(k-1), \ldots, u(k-p_u)\}$$

To analyze the effect of this control input, we look at the modeling error, which is defined as the difference $\epsilon(k+1)$ between the actual plant output and that predicted by the model:

$$e(k+1) = y(k+1) - \\ f^\wedge\{y(k), y(k-1), \ldots, y(k-p_y); u(k-1), \ldots, u(k-p_u)\} - g^\wedge \\ \{y(k), y(k-1), \ldots, y(k-p_y); u(k-1), \ldots, u(k-p_u)\} u(k) \quad (8)$$

Substituting the expression for the control input, given by Eq. (7), in Eq. (8) gives:

$$e(k+1) - y_{ad}(k) = y(k+1) - y_{ref}(k+1) + K_{Pe}\{y_{ref}(k) - y(k)\} - \\ K_{1e}e_1(k) \quad (9)$$

In terms of the definition of the tracking error, Eq. (9) can written as:

$$e(k+1) + K_{Pe}\{y(k) - y_{ref}(k)\} + K_{1e}e_1(k) = \epsilon(k+1) - y_{ad}(k) \quad (10)$$

Equation (10) represents a key equation of this approach. The left hand side of Eq. (10) is the desired second order error dynamics. The right hand side of Eq. (10) is the difference between the modeling error and adaptive augmentation signal input. Equation (10) indicates that, if the adaptive augmentation signal can learn the modeling error and cancel this error, the error dynamics of this control loop will be restored to its desired nature. In other words, we will recapture the performance desired from this control loop. We, therefore, define the left hand side of Eq. (10) as the performance error, E(k), which is more realistically expressed as a vector of performance error components.

$$E(k+1) = e(k+1) + K_{Pe}e(k) + K_{1e}e_1(k) \quad (11)$$

We can now form a Lyapunov function of the performance error as:

$$L(k) = \gamma |E(k)|^2, \quad (12)$$

An update law now can now be devised for the adaptive augmentation input, $y_{ad}$, that imposes monotonically decreasing behavior on this Lyapunov function.
Parameterization and Update Laws for the Adaptive Augmentation.

In this section, we investigate two questions. The first relates to the parameterization of the modeling error, and the second relates to the choices for designing stable update laws.
1. Parameterization for a Linear System:

Consider a linear system of the form:

$$x(k+1) = Ax(k) + Bu(k), \quad (13)$$

where x and u are vector components of the plant variables and the control inputs and A and B are system matrices. In a manner similar to that illustrated by Eqs. (3-5), the control input is computed as:

$$u(k) = B^{\wedge -1}\{x_{ref}(k+1) + K_{Pe}e(k) + K_{1e}e_1(k) - x_{ad}(k) - A^\wedge x(k)\} \quad (14)$$

where $A^\wedge$ and $B^\wedge$ are estimates of the system A and B matrices. If the system matrices (A, B) are known, adaptive augmentation is not needed, and the control input is computed as:

$$u(k) = B^{-1}\{x_{ref}(k+1) + K_{Pe}e(k) + K_{1e}e_1(k) - Ax(k)\} \quad (15)$$

If these control inputs are to provide the same desired error dynamics, they must be equated, which gives the form of the idealized value of the augmentation signal $x_{ad}(k)$.

$$B^{\wedge -1}\{x_{ref}(k+1) + K_{Pe}e(k) + K_{1e}e_1(k) - x_{ad}(k) - Ax(k)\}\} = \\ B^{-1}(x_{ref}(k+1) + K_{Pe}e(k) + K_{1e}e_1(k) - Ax(k)) \quad (16)$$

$$x^\wedge_{ad}(k) = \{(I - B^\wedge B^{\wedge -1})\}\{x_{ref}(k+1) + K_{Pe}e(k) + K_{1e}e_1(k)\} + \\ (B^\wedge B^{\wedge -1} A - A^\wedge)x(k) = \\ \{(I - B^\wedge B^{\wedge -1})(B^\wedge B^{\wedge -1} A - A^\wedge)\{x_{ref}(k+1) + K_{Pe}e(k) + K_{1e}e_1(k)\} \quad (17)$$

2. Parameterization for a Non-Linear System Affine in Control:

Consider a non-linear system that is affine in control, and whose dynamics can be written as linear in parameters.

$$x(k+1) = W_f \beta_f(k) + Bu(k) \quad (18)$$

where $W_f$ is the linear dynamic weight matrix, and the vector $\beta_f$ corresponds to the linear and/or nonlinear functions of the system state. The control input is computed in a similar manner as:

$$u(k) = B^{\wedge -1}\{x_{ref}(k+1) + K_{Pe}e(k) + K_{1e}e_1(k) - x_{ad}(k) - W^\wedge_f \beta_f(k)\} \quad (19)$$

where $W_f^\wedge$ and $B^\wedge$ are the corresponding estimates of the system matrices. By carrying out the analysis similar to the linear system case, the ideal augmentation signal can be computed to be:

$$x_{ad}(k) = \{(I - B^\wedge B^{\wedge -1})\} \\ \{(B^\wedge B^{\wedge -1} W_f - W^\wedge_f)\{x_{ref}(k+1) + K_{Pe}e(k) + K_{1e}e_1(k)\} \quad (20)$$

Equations (17) and (20) imply that the ideal augmentation signal can be written as:

$$x_{ad}(k) = W^{*T}_{ad} \beta_f(k) \quad (21)$$

with the ideal weights, $W^*_{ad}$, and the basis functions, $\beta$, as given in Eqs. (16) and (19). These are the same basis functions used in Rysdyk and Calise, ibid. Thus, we can parameterize a neural network in this form, and compute the ideal weights iteratively using an appropriate update algorithm.
3. Update Laws for the Adaptive Augmentation.

Having looked at the question of parameterization, we now construct a stable update law for the parameters $W_{ad}$. Parameterizing the adaptive augmentation signal in the form given by Eq. (20), and using the definition of the performance error as given in Eq. (11), Eq. (10) can be rewritten in vector form as:

$$E(k+1) = \epsilon(k) - x_{ad}(k), \quad (22)$$

Compared to Eq. (10), this is written for an error vector, E, corresponding to the general case of multiple control loops. Written in this form, the equation indicates that one estimates the vector modeling error, $\epsilon(k)$ (for all loops) using the adaptive augmentation signal $x_{ad}(k)$. The vector E(k+1) is a corresponding error in the estimate. This error dynamics for the performance error E(k) corresponds to a system identification like problem. This opens up a host of approaches for doing this online system identification. In this work, we consider a normalized gradient update approach.
4. Normalized Gradient Update.

Let $E_i(k)$ correspond to the ith element of the vector performance error E(k). Let $W^*_{ad,ii}$ represent the ith column vector of the weight matrix $W^*_{ad}$, which corresponds to the ideal weights that minimize the performance error vector components $E_i(k)$ to $\Delta^* = \{\delta^*_1, \ldots, \delta^*_n\}$.

Similarly, let $W_{ad,i}$ represent the ith column vector of the current estimate of the ideal weight matrix. The update law for each of these column vectors of the weight matrix is given as:

$$W_{ad,i}(k) = W_{ad,i}(k-1) \{\gamma^* E_i(k)^* \beta(k-1)\} / \{1 + \beta^{tr}(k-1)\beta(k-1)\} \quad (23)$$

The parameter $\gamma$ (Eq. (12)) corresponds to the learning rate that lies in a range $$0 < \gamma \leq 2 \quad (24)$$

Reference [11] proves that with this weight update law, the performance error, $E(k)_i$ is monotonically decreasing for all i, Further, it is known that if the system experiences sufficient persistent excitation, the weights $W_{ad,i}$ approach the ideal weights $W^*_{ad,i}$.

5. What Happens to Tracking Error?

The final part of this analysis investigates the behavior of the system error $e(k)$. This work provides an update only when modeling error is present, as opposed to presence of tracking error. However, tracking error is what is ultimately important. It is, therefore, appropriate to analyze the asymptotic behavior of the tracking error given the behavior of the performance error. For simplicity, in this analysis we consider the case where the desired error dynamics is first order given as:

$$E_i(k) = e_i(k+1) - K_{Pe} e_i(k) = 0 \quad (25)$$

Let $E_i(k) < \delta_i$ after time k, where $\delta$ is some small positive scalar. This implies $$|e_i(k+1) - K_{Pe} e_i(k)| < \delta, \quad (26)$$

From The Cauchy-Schwarz inequality, $$|e_i(k+1) - K_{Pe} e_i(k)| \geq |e_i(k+1)| - |K_{Pe}||e_i(k)|. \quad (27)$$

Equations (26) and (27) imply:

$$|e_i(k+2)| < |K_{Pe}||e_i(k+1)| + \delta, \quad (28\text{-}1)$$

$$< |K_{Pe}|^2 |e_1(k)| + \delta\{1 + |K_{Pe}|\}$$

$$|e_i(k+n)| < |K_{Pe}|^n |e_1(k)| + \delta\{1 + |K_{Pe}| + \ldots + |K_{Pe}|^{n-1}\} \quad (28\text{-}n)$$

Because $|K_{Pe}| < 1$ for stable error dynamics, as $k \to \infty$, $|e_i(k)|$ is bounded above as:

$$|e_1(k)| < \delta / \{1 - |K_{Pe}|\} \quad (29)$$

Thus, if the performance error is bounded, Eq. (29) establishes bounds on the tracking errors. A similar analysis can be carried out for second order error dynamics. The result summarizes that as long as the desired error dynamics (first or second order) is stable, the tracking error will be bounded above, given that the performance error is bounded.

6. Application to Aircraft Control.

The modeling error-driven performance-seeking adaptive control design was implemented for aircraft roll, pitch, and yaw rate control. The NASA Intelligent Flight Controller (IFC) design has been tested, and is currently undergoing various modifications for being flight-tested on the research F-15 aircraft. The IFC design has been implementing the adaptive control design as outlined by Rysdyk and Calise, ibid. For implementing the performance seeking adaptive augmentation, the requirement was that it needed to fit within the existing architecture. The main issue in the implementation is that the baseline controller in the IFC architecture uses continuous-time aircraft dynamic inversion, whereas the proposed design has been outlined in the discrete-time. The equations outlined in the preceding sections have been formulated for a discrete-time model inversion. We realized, however, that after reducing the problem to the core error dynamics, the problems became identical. The error equation for the continuous-time implementation for a desired second-order error dynamics for a scalar error e is given as:

$$(\partial e/\partial t) + K_{Pe} e + K_{Ie} \int e(t') dt' = \epsilon - U_{ad}(k). \quad (30)$$

The error is defined in the same manner as the discrete case (e.g., $q - q_{ref}$). The modeling error, $\epsilon$, however corresponds to the difference in the acceleration, as predicted by the model, and the acceleration actually observed. Similarly, $U_{ad}$ represents the augmentation acceleration command given by the adaptive block. If the left hand side of Eq. (30) is discretized while maintaining the continuous-time constants, the resulting scalar discrete-time equation is given as:

$$\{e(k) + (K_{PE} \Delta t - 1)e(k-1) + K_{Ie} \Delta t\, ei(k-1)\} / \Delta t = \{\epsilon - U_{ad}\}. \quad (31)$$

Defining the left hand side of Eq. (31) as the modified performance error, $\hat{E}(k)$, one obtains $$\hat{E}(k) = \epsilon - U_{ad}(k). \quad (32)$$

Figure 3B:
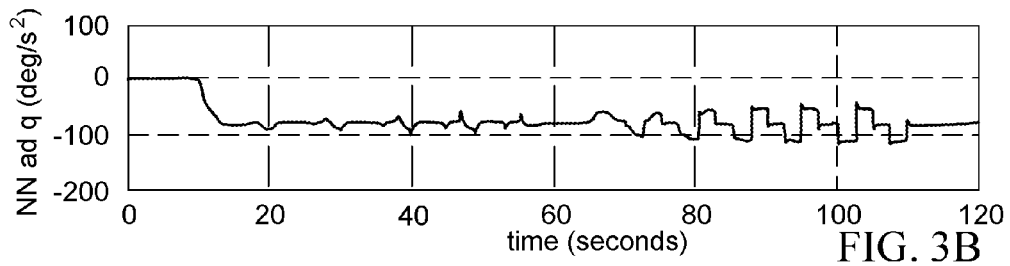
Figure 3C:
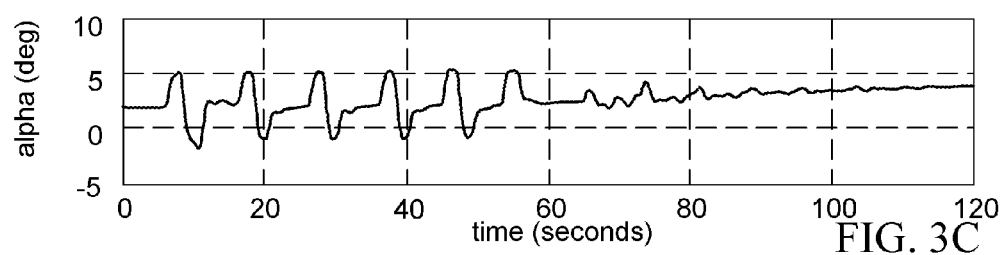
Figure 4A:
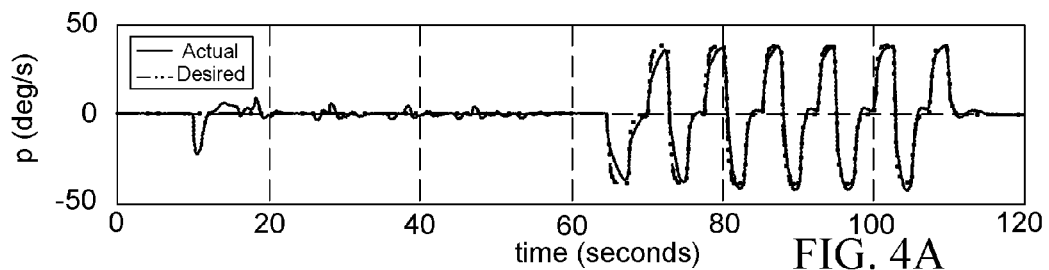
Figure 4B:
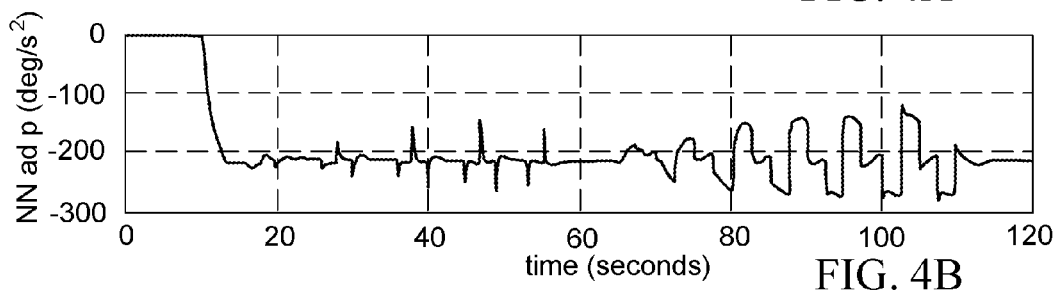
Figure 4C:
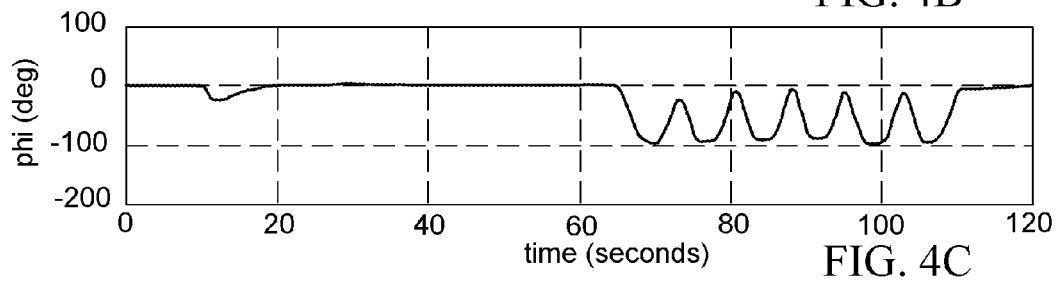
Figure 5A:
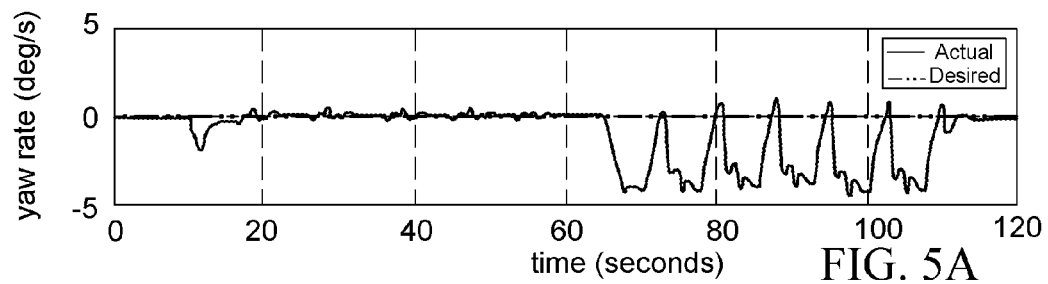
Figure 5B:
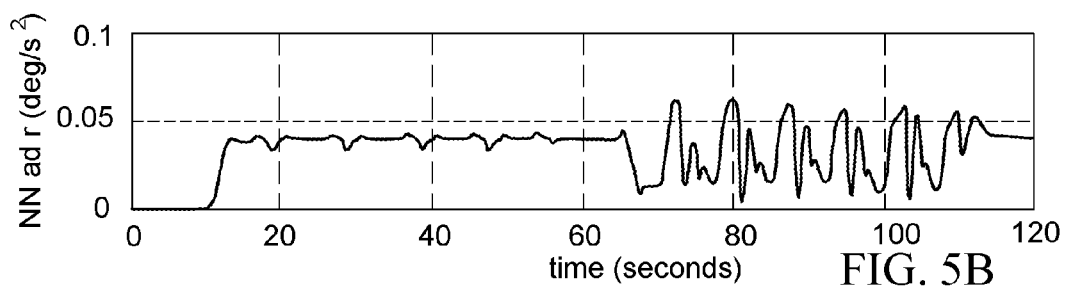
Figure 5C:
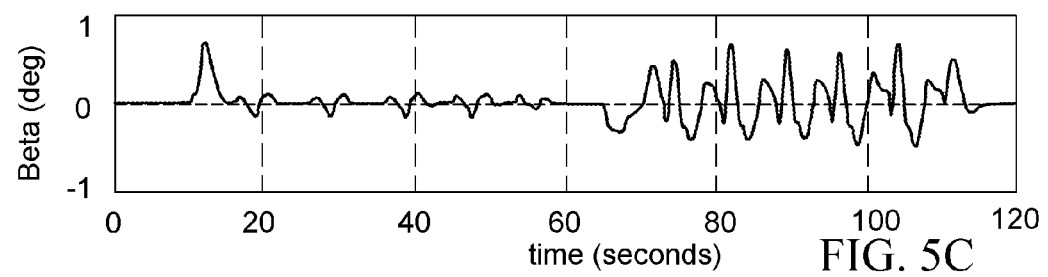
Figure 6A:
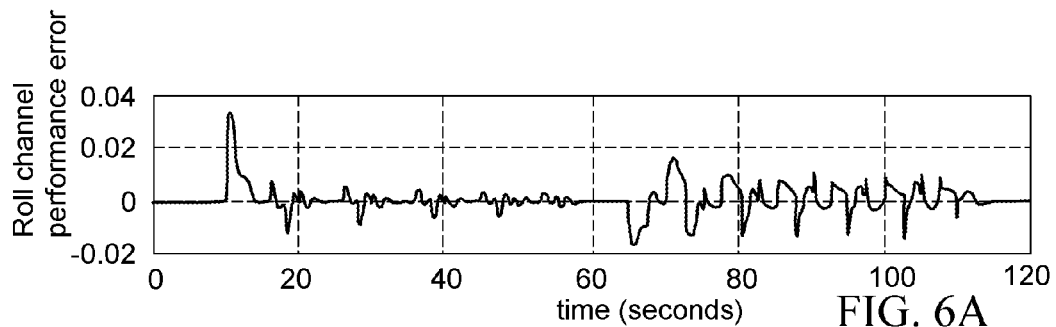
FIGS. 6A-6C and 7A-7D graphically illustrate performance errors for the roll, pitch and yaw behavior for a selected test.
Figure 6B:
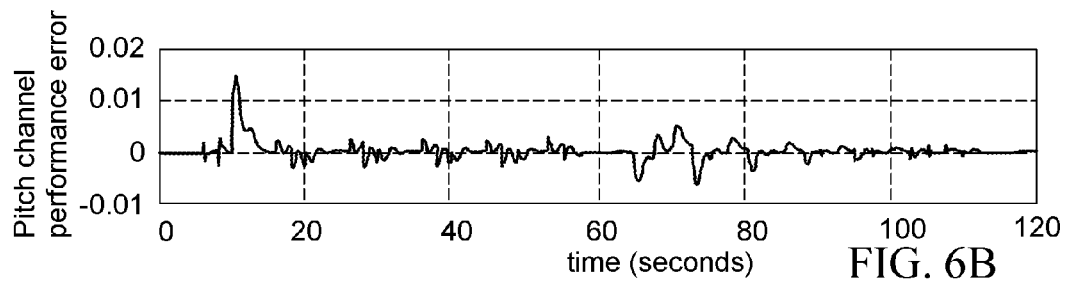
Figure 6C:
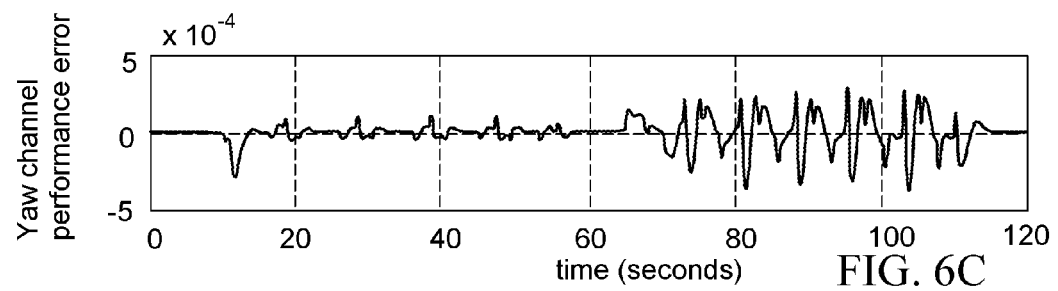
Figure 7A:
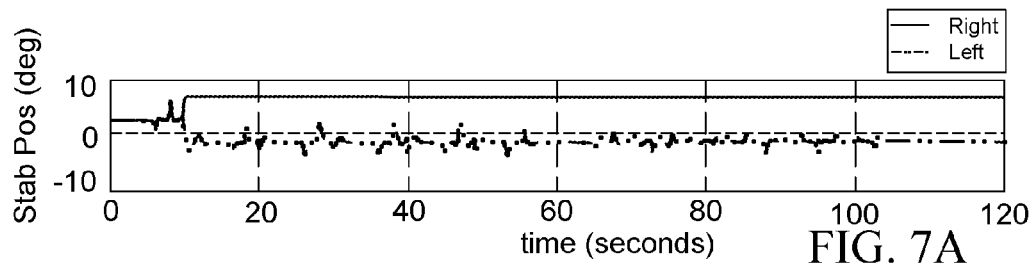
Figure 7B:
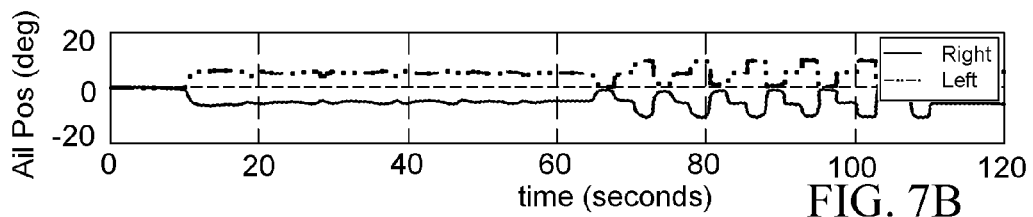
Figure 7C:
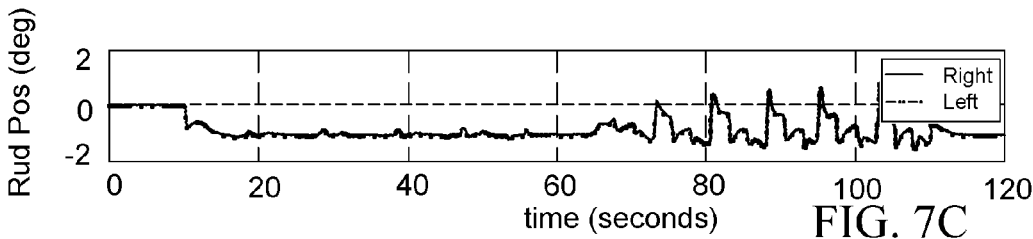
Figure 7D:
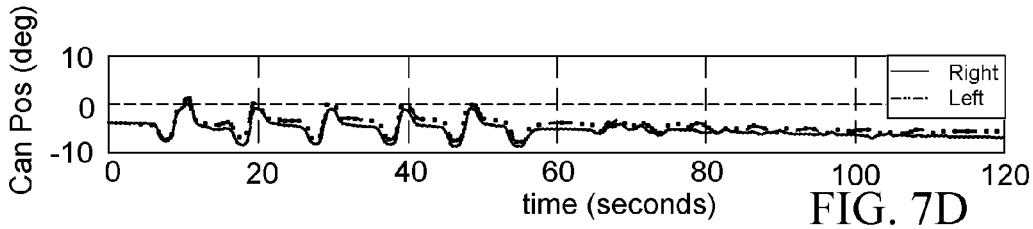
Figure 8A:
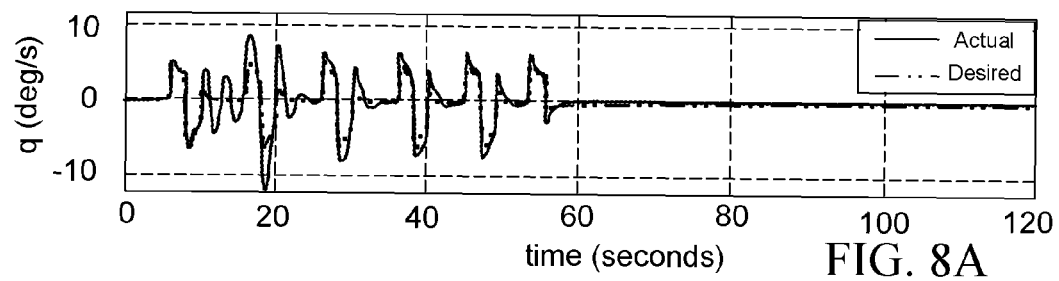
FIGS. 8A-8C through 10A-10C illustrate pitch, roll and yaw acceleration behavior, where a system failure is inserted at an intermediate time (10 sec).
Figure 8B:
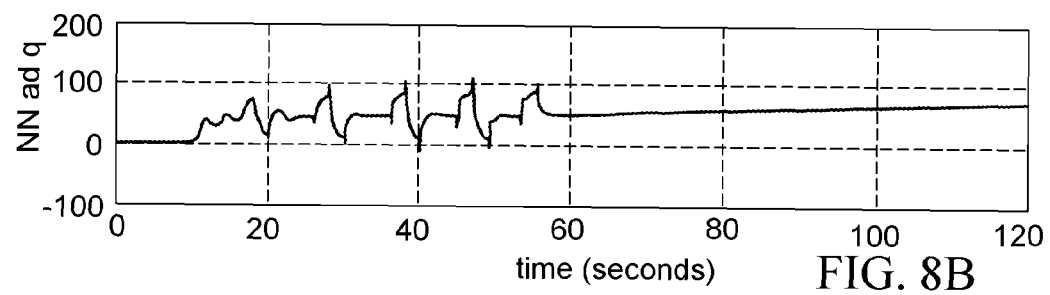
Figure 8C:
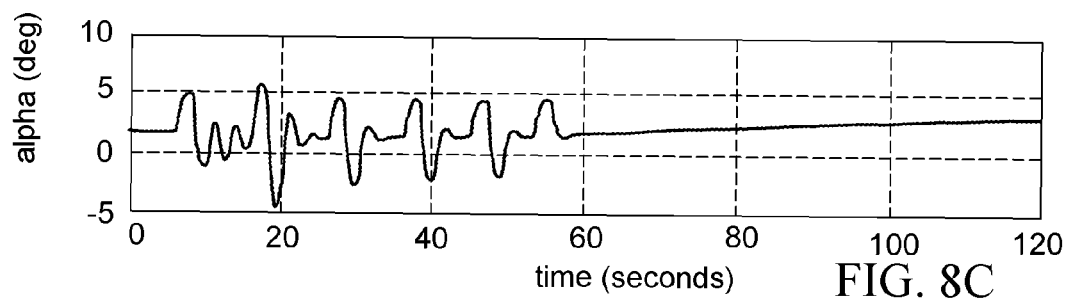
Figure 9A:
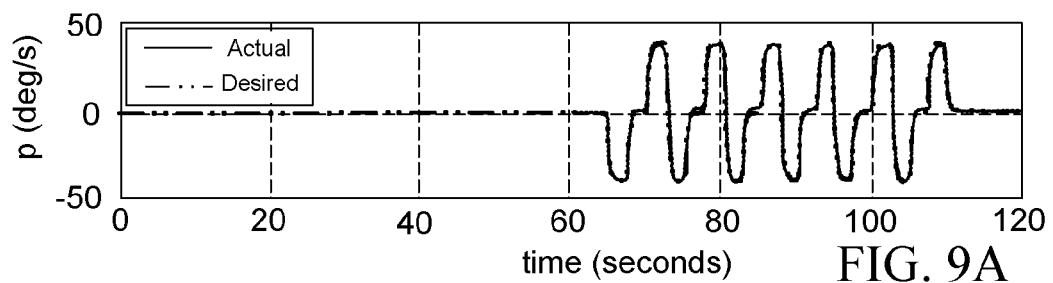
Figure 9B:
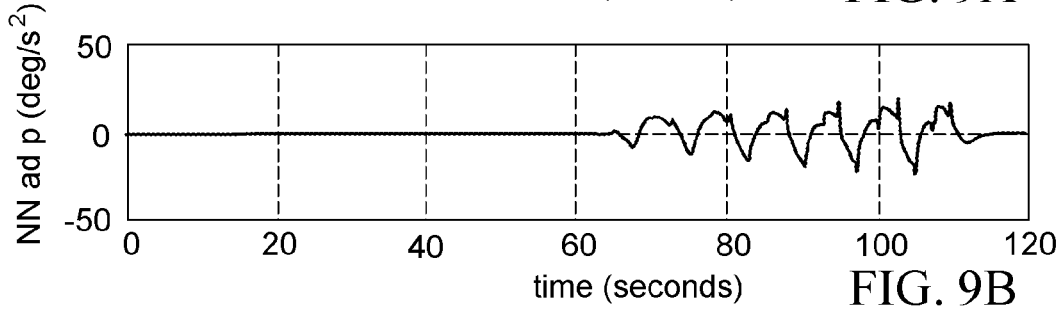
Figure 9C:
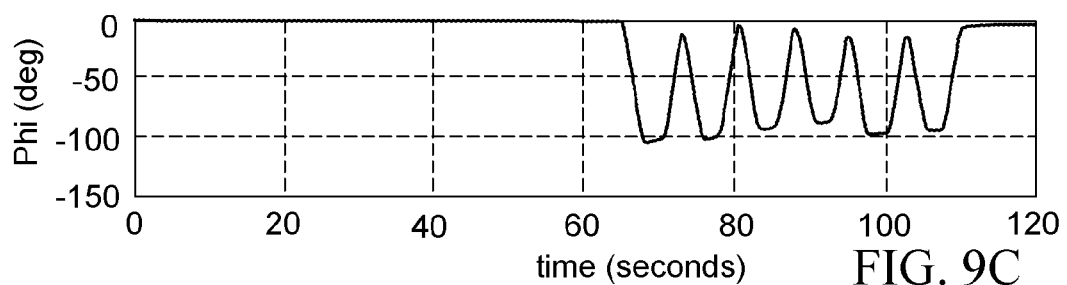
Figure 10A:
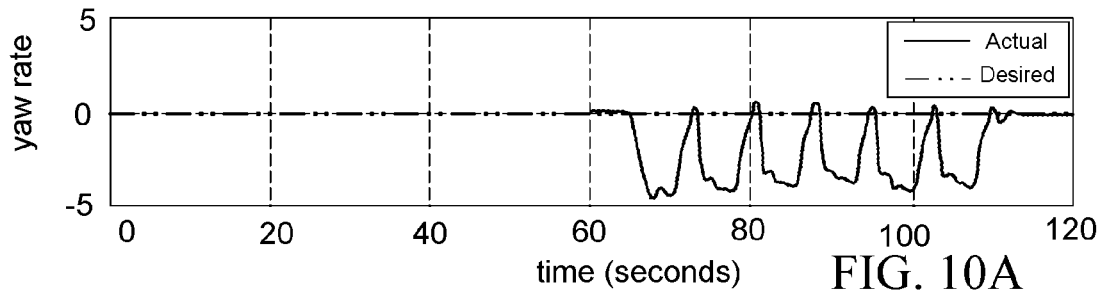
Figure 10B:
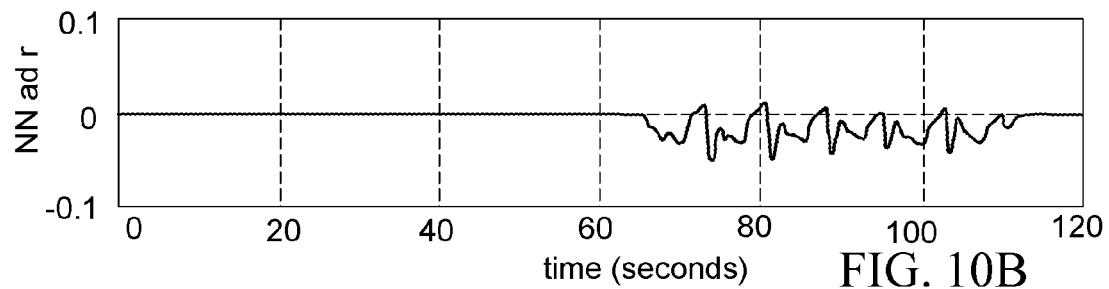
Figure 10C:
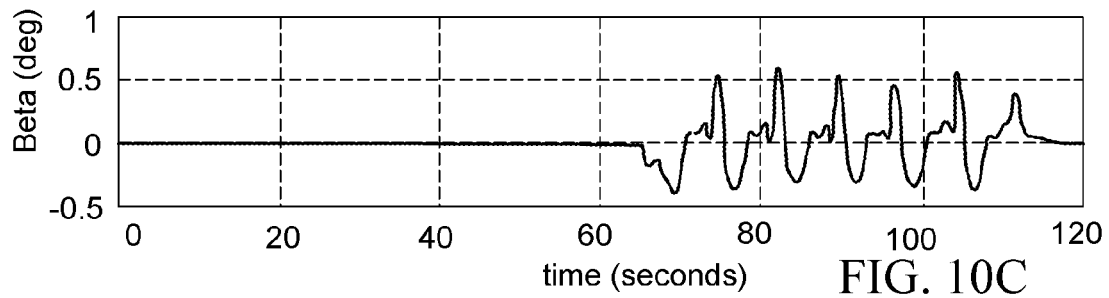
Figure 11A:
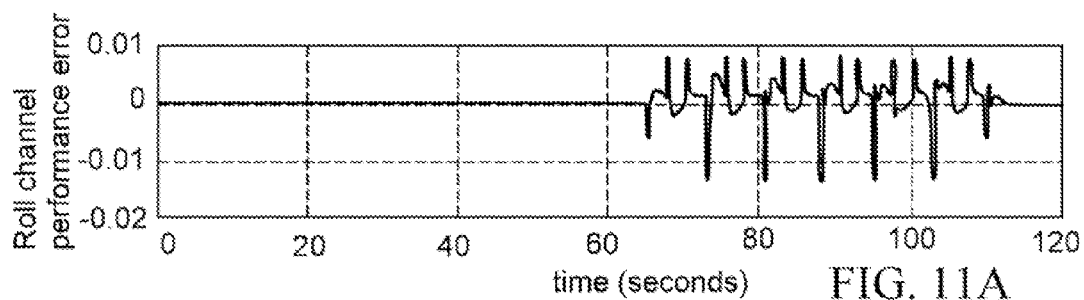
FIGS. 11A-11C illustrate roll, pitch and yaw performance errors corresponding to the system failure introduced in FIGS. 8A-C, 9A-C and 10A-C.
Figure 11B:
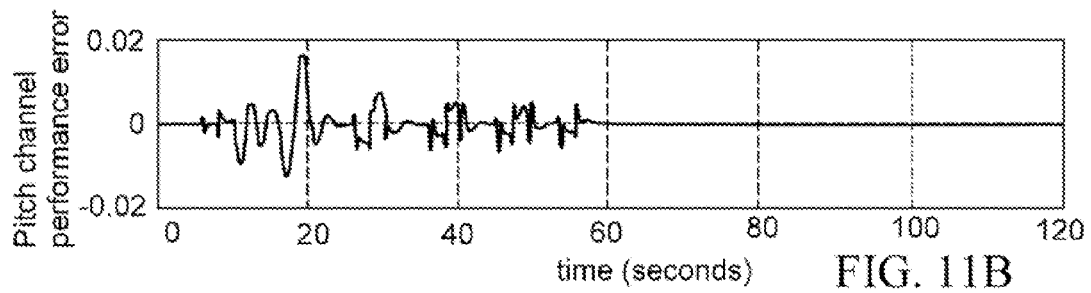
Figure 11C:
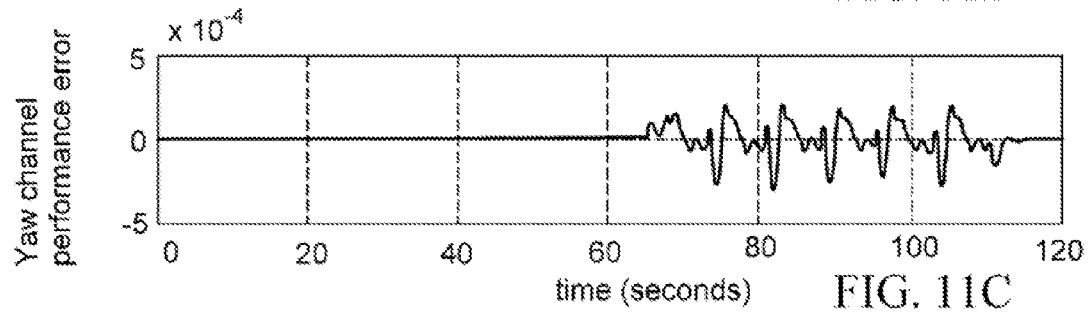
Figure 12A:
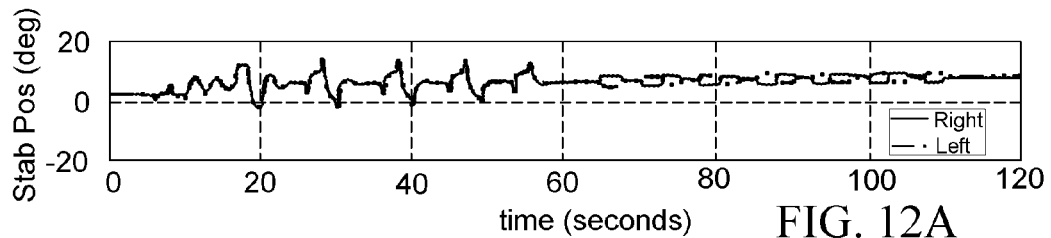
FIGS. 12A-12D illustrate aircraft surface commands (stabilizer, rudder, canard) corresponding to the system failure introduced in FIGS. 8A-C, 9A-C and 10A-C.
Figure 12B:
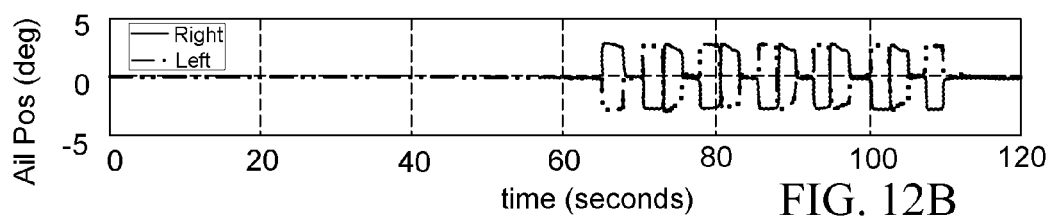
Figure 12C:
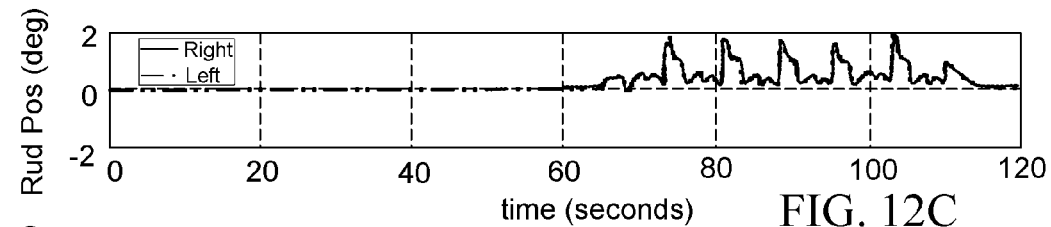
Figure 12D:
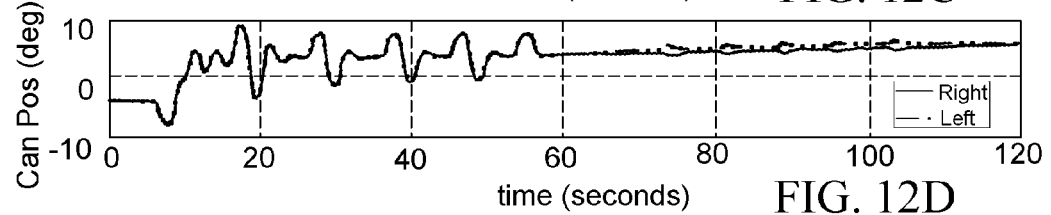

This modified performance error equation is identical to the discrete-time version given by Eq. (21). The adaptive augmentation acceleration signal $U_{ad}(k)$ can be parameterized in a similar manner, and the same update laws remain valid for the parameters of this augmentation signal for reducing $\hat{E}(k)$. A zero value of this modified performance error restores the second order error dynamics (LHS of Eq. (31)) to zero, and thereby regains the desired performance from the control loops. Formulated in this manner, this adaptive approach fits within the existing IFC framework, and is considered as an alternate approach for flight testing. In the following discussion, we present some results of this implementation on the high fidelity model of the modified F-15 aircraft used at the NASA Dryden Flight Research Center. The adaptive control architecture is kept the same as in the original IFC design. This design has three loops, one for each of the pitch, yaw, and roll, respectively. Adaptive augmentation is provided to each loop. Kaneshige, and Burken., "Enhancements to a Neural Adaptive Flight Control System for a Modified F-15 Aircraft," AIAA-2008-6986, give details on the implementation approach such as choice of the basis functions etc. The only difference is that the update law is given by Eq. (23). In this study, we look at two cases. In the first case, the right stabilator is locked at 4 degrees at t=10 sec into the flight experiment. In the second case, the canard multiplier is set at −1, again at t=10 sec into the flight experiment. The behavior of the aircraft and update algorithm is examined for the longitudinal and lateral pilot stick inputs given by FIGS. 2A-2B FIGS. 3A-3B through 7A-7D display the behavior of the aircraft and the neural net signal for right stabilator failure at t=10 sec. In FIGS. 3A-3C, the learning in the pitch channel is observable, when the aircraft actual pitch rate follows the desired pitch rate. FIGS. 4A-4C and 5A-5C display learning behavior in the roll and yaw channels, respectively. FIGS. 6A-6C displays the behavior of the performance errors in each of the three axes as learning proceeds. These performance errors drive the updates in each of the three axe with performance errors becoming smaller as time increases. FIGS. 7A-7D display aircraft surface commands for this maneuver. In a similar manner, FIGS. 8A-8C, 9A-9C. 10A-10C and 11A-11C display the results for insertion of an incorrect canard multiplier. FIGS. 12A-12D display aircraft surface commands for the incorrect canard multiplier situation. Note the good learning achieved in the pitch and roll channels.

What is claimed is:

1. A method for modeling error-driven adaptive control of an aircraft, the method comprising:
   providing a selected aircraft variable, $y(k+1)$, at a time index having a value $k+1$, as a matrix sum of $W_f \beta_f(k)$ and $B\, u(k)$, where $\beta_f(k)$ includes the at least one aircraft variable $y(k)$ in a linear or nonlinear format, $W_f$ is a matrix of selected aircraft variable weighting coefficients, $u(k)$ is a control variable vector for the at least one aircraft variable, and $B$ is a matrix of control variable weighting coefficients that is not yet known;
   modeling an aircraft plant operation using a first neural network modeling mechanism, where the first neural network mechanism incorporates an assumption that the aircraft plant is operating within a normal range, without perturbations and without a tracking error vector $e(k)$ that would cause the aircraft plant to experience an excursion outside a normal range of operation;
   providing a finite bound for the tracking error vector $e(k)$ for operation of the aircraft within the normal range;
   when (1) at least one component of the tracking error vector $e(k)$ is experiencing an excursion, determining if (2) return of the at least one component of the tracking error vector $e(k)$ toward a selected reference vector does not lie on or adjacent to a selected controller error characteristic;
   when the conditions (1) and (2) are satisfied for at least one value of the time index $k$, introducing at least one change in at least one parameter of the neural network modeling mechanism and modeling the aircraft plant operation according to a modified neural network mechanism with the at least one changed modeling parameter; and
   when the conditions (1) is satisfied and condition (2) is not satisfied, continuing to model the aircraft plant operation using the first neural network mechanism, with little or no change in any modeling parameter of the first neural network mechanism.

2. The method of claim 1, further comprising:
   expressing said tracking error $e(k)$ as a difference $$e(k)=y_{ref}(k)-y(k)$$

between a reference vector $y_{ref}(k)$ and said vector representing said at least one aircraft variable $y(k)$ at said time index $k$;
   expressing a change in said tracking error vector $e(k)$ between said time index value $k$, and said time index value $k+1$ in a tracking error vector equation $$e(k+1)+K_{pe}\,e(k)+K_{1e}e_1(k)=0,$$

where $e_1(k)$ represents an integrated tracking error up to and including said time index $k$, and $K_{pe}$ and $K_{1e}$ are gain values;
   expressing a changed value in said aircraft variable $y(k)$ as a sum $$y(k+1)=y_{ref}(k+1)+K_{pe}\{y_{ref(k)}\}-K_{1e}e_1(k);$$

interpreting said control relationship as a linear or affine relationship $$y(k+1)=A\,y(k)+B\,u(k),$$

where $A$ is a matrix, with $A$ as yet unknown, and said matrix $B$ is invertible, with an inversion matrix $B^{-1}$;
   providing estimates, $\hat{A}$ and $\hat{B}$, of the matrix $A$ and said matrix $B$;
   expressing said control variable vector $u(k)$ as a first sum $u(k)=B^{-1}\{y_{ref}(k+1)+K_{pe}\,e(k)+K_{1e}\,e_1(k)\}$;
   expressing said control variable $u(k)$ as a second sum $$u(k)=\hat{B}^{-1}\{y_{ref}(k+1)+K_{pe}e(k)+K_{1e}\,e_1(k)-y_{ad}(k)-\hat{A}y(k)\},$$

where $y_{ad}(k)$ is an adaptive augmentation vector that is included to encourage said aircraft to satisfy the tracking error vector equation: and
   expressing an alternative aircraft variable $\hat{y}_{ad}(k)$ as a third sum $$\hat{y}_{ad}(k)=\{(I-\hat{B}\,B^{-1})\}\{y_{ref}(k+1)+K_{pe}e(k)+K_{1e}\,e_1(k)\}+(\hat{B}\,B^{-1}A-\hat{A})y(k)=\{(I-\hat{B}\,B^{-1})(\hat{B}\,B^{-1}A-\hat{A})\}\{y_{ref}(k+1)+K_{pe}\,e(k)+K_{1e}\,e_1(k)\}.$$

3. The method of claim 2, further comprising:
   expressing at least part of plant dynamics of said aircraft as a control vector relation, $$y(k+1)=f\{y(k),y(k-1),\ldots,y(k-p_y;u(k-1),\ldots,u(k-p_u)\}++g\{y(k),y(k-1),\ldots,y(k-p_y;u(k-1),\ldots,u(k-p_u)\}\,u(k),$$

where $f$ is a function of one or more of the variables $y(k')$ ($k'=k, k-1, \ldots, k-p_u$) and one or more of the variables $u(k')$, $g$ is a function of one or more of the variables $y(k')$ and one or more of the variables $u(k')$, and $f$ and $g$ characterize the aircraft plant and are as yet unknown;
   inverting the control relation to express the control vector $u(k)$ in a form needed to achieve a desired aircraft control dynamics as $$u(k)=\{y_{ref}(k+1)+K_{Pe}\{Y_{ref}(k)-y(k)\}-K_{1e}\,e_1(k)-f\{y(k),y(k-1),\ldots,y(k-p_y;u(k-1),\ldots,u(k-p_u)\}\}/g\{y(k),y(k-1),\ldots,y(k-p_y;u(k-1),\ldots,u(k-p_u)\};$$

providing an approximate model of the aircraft plant dynamics, with corresponding estimates, $\hat{f}$ and $\hat{g}$, for the respective functions $f$ and $g$;
   expressing an estimate $\hat{u}(k)$ of a control vector that will achieve a desired aircraft control dynamics as $$\hat{u}(k)=\{Y_{ref}(k+1)+K_{Pe\,\{Yref}(k)\}-K_{1e}e_1(k)-y_{ad}(k)-\hat{f}\{y(k),y(k-1),\ldots,y(k-p_y;u(k-1),\ldots,u(k-p_u)\}\}/\hat{g}\{y(k),y(k-1),\ldots,y(k-p_y;u(k-1),\ldots,u(k-p_u)\};$$

and
   providing an estimate $\hat{e}(k)$ of said tracking error as said tracking error $$\hat{e}(k+1)=y(k+1)-\hat{f}\{y(k),y(k-1),\ldots,y(k-p_y;u(k-1),\ldots,u(k-p_u)\}-\hat{g}\{y(k),y(k-1),\ldots,y(k-p_y;u(k-1),\ldots,u(k-p_u)\}\hat{u}(k).$$

* * * * *